United States Patent
Yang et al.

(10) Patent No.: US 10,082,896 B1
(45) Date of Patent: Sep. 25, 2018

(54) STYLUS RECEIVING APPARATUS

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Xin Yang, Shenzhen (CN); Bing-Sen Wu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/626,289

(22) Filed: Jun. 19, 2017

(30) Foreign Application Priority Data

Mar. 16, 2017 (CN) .......................... 2017 1 0155626

(51) Int. Cl.
*G06F 1/16* (2006.01)
*G06F 3/039* (2013.01)

(52) U.S. Cl.
CPC ............ *G06F 3/039* (2013.01); *G06F 1/1626* (2013.01)

(58) Field of Classification Search
CPC .... G06F 3/03545; G06F 3/039; G06F 1/1626; G06F 1/1656; G06F 1/1679
See application file for complete search history.

(56) References Cited

U.S. PATENT DOCUMENTS

| | | | | |
|---|---|---|---|---|
| 6,664,953 B2* | 12/2003 | Quek | ................... | G06F 1/1616 |
| | | | | 178/18.01 |
| 2002/0003532 A1* | 1/2002 | Huat | ..................... | G06F 1/1616 |
| | | | | 345/179 |
| 2002/0060098 A1* | 5/2002 | Liu | ........................ | G06F 1/1626 |
| | | | | 178/19.01 |
| 2003/0184529 A1* | 10/2003 | Chien | .................. | G06F 1/1626 |
| | | | | 345/179 |
| 2009/0244009 A1* | 10/2009 | Staats | .................... | G06F 1/162 |
| | | | | 345/168 |
| 2011/0292003 A1* | 12/2011 | Liang | .................... | B43K 24/14 |
| | | | | 345/179 |
| 2012/0133619 A1* | 5/2012 | Chen | .................... | G06F 1/1626 |
| | | | | 345/179 |
| 2015/0035809 A1* | 2/2015 | Kim | ....................... | G06F 1/1656 |
| | | | | 345/179 |
| 2015/0205390 A1* | 7/2015 | Yeh | ....................... | G06F 3/0383 |
| | | | | 345/179 |

* cited by examiner

*Primary Examiner* — Anthony Q Edwards
(74) *Attorney, Agent, or Firm* — ScienBiziP, P.C.

(57) ABSTRACT

A stylus receiving apparatus for safekeeping of a stylus includes a receiving box, a guiding member, a toggle, and a rotating member. The rotating member defines an opening. The guiding member is attached to the rotating member. The toggle is attached to the guiding member. The toggle drives the guiding member to slide. The guiding member drives the rotating member to rotate, to expose the opening to take out the stylus, or to store the stylus after use.

20 Claims, 9 Drawing Sheets

STYLUS RECEIVING APPARATUS

CROSS-REFERENCE TO RELATED APPLICATIONS

This application claims priority to Chinese Patent Application No. 201710155626.3, filed on Mar. 16, 2017, the contents of which are incorporated by reference herein.

FIELD

The subject matter herein generally relates to stylus receiving apparatus.

BACKGROUND

Electronic devices, for example, electronic books and personal digital assistants have touch panels. Styluses are used to operate on the touch panel. The stylus is generally randomly placed. Thus, the stylus tends to wear out.

BRIEF DESCRIPTION OF THE DRAWINGS

Implementations of the present technology will now be described, by way of example only, with reference to the attached figures.

DETAILED DESCRIPTION

Figure 1:
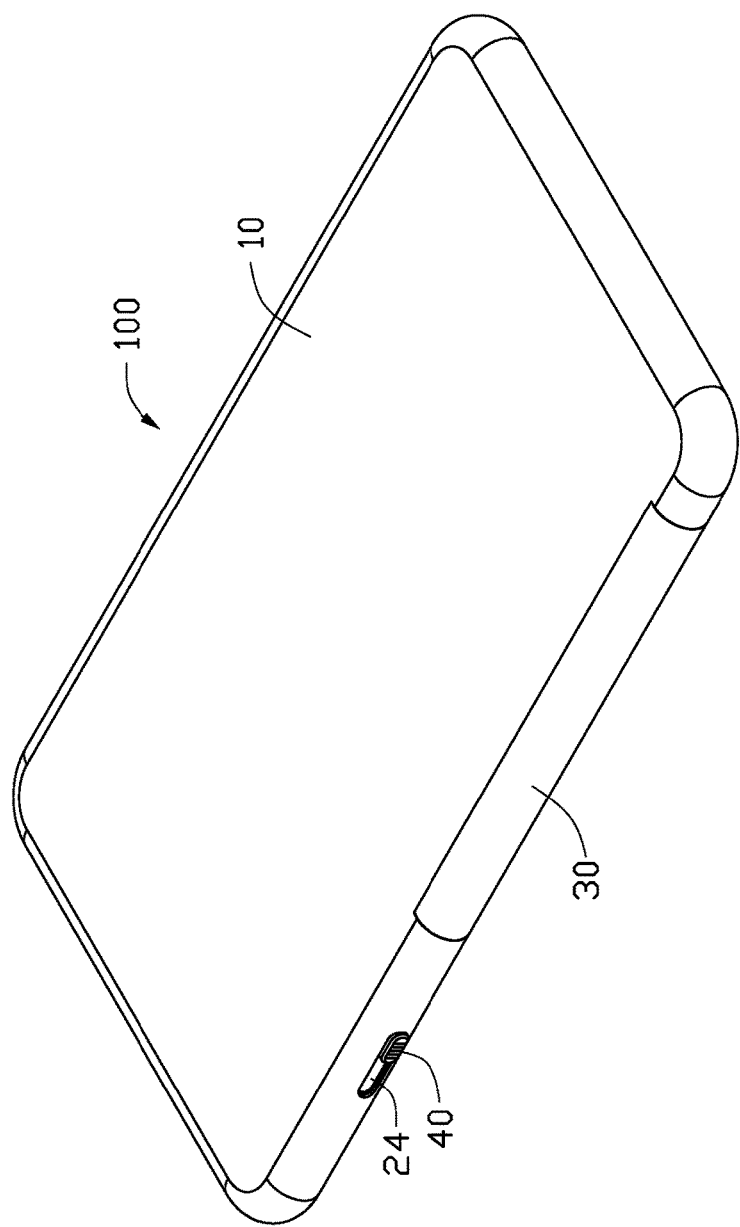
FIG. 1 is an isometric view of an exemplary embodiment of a stylus receiving apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein. The disclosure is illustrated by way of example and not by way of limitation in the figures of the accompanying drawings, in which like references indicate similar elements. It should be noted that references to "an" or "one" exemplary embodiment in this disclosure are not necessarily to the same exemplary embodiment, and such references mean at least one.

The term "comprising" means "including, but not necessarily limited to"; it specifically indicates open-ended inclusion or membership in a so-described combination, group, series, and the like.

Figure 2:
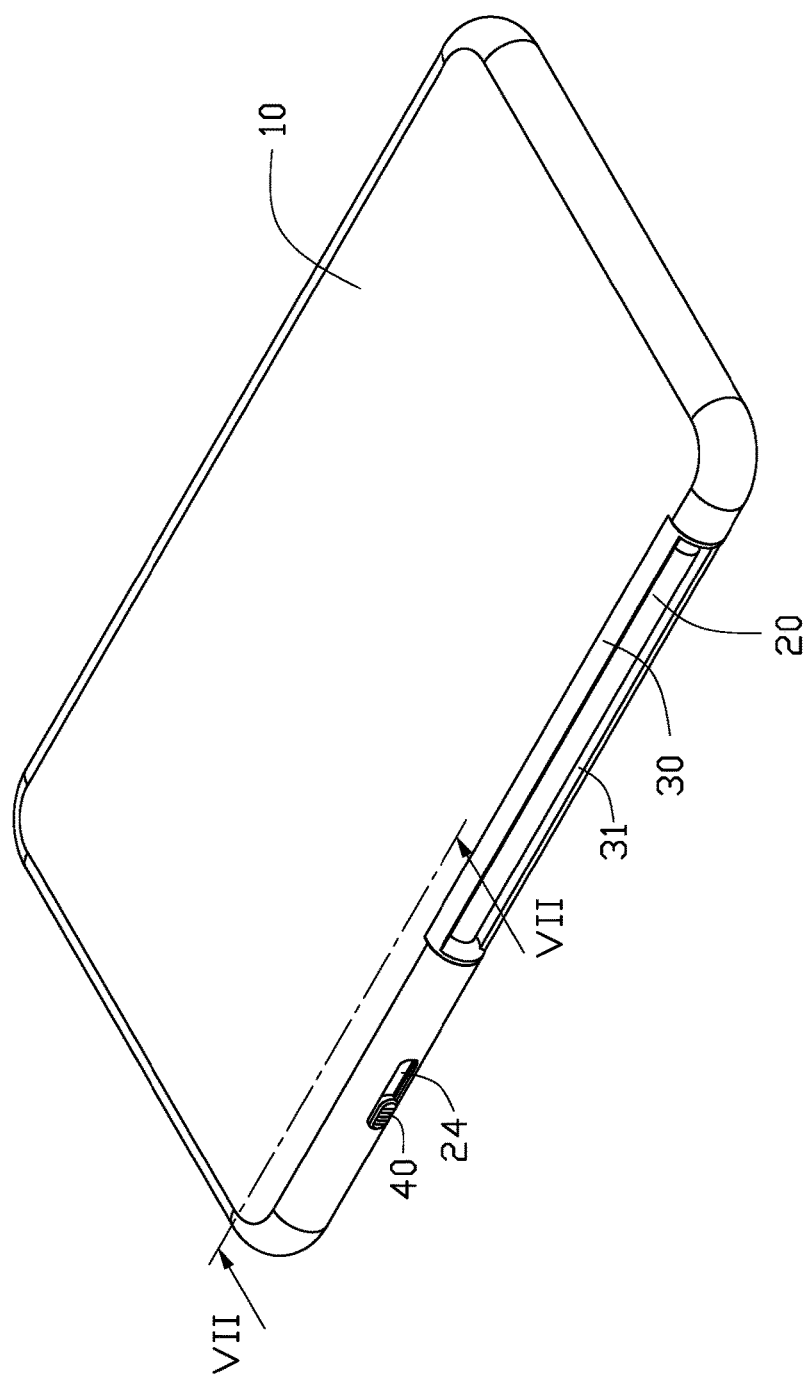
FIG. 2 is similar to FIG. 1, but with a stylus shown.

FIGS. 1 and 2 illustrate a stylus receiving apparatus 100 for receiving a stylus 200. The stylus receiving apparatus 100 includes a receiving box 10 and a rotating member 30. The rotating member 30 defines an opening 31. The stylus 200 passes through the opening 31 to be positioned in the rotating member 30. The rotating member 30 is rotatable to position the opening 31 between the rotating member 30 and the receiving box 10 to prevent the stylus 200 from moving out the receiving box 10 through the opening 31.

Figure 3:
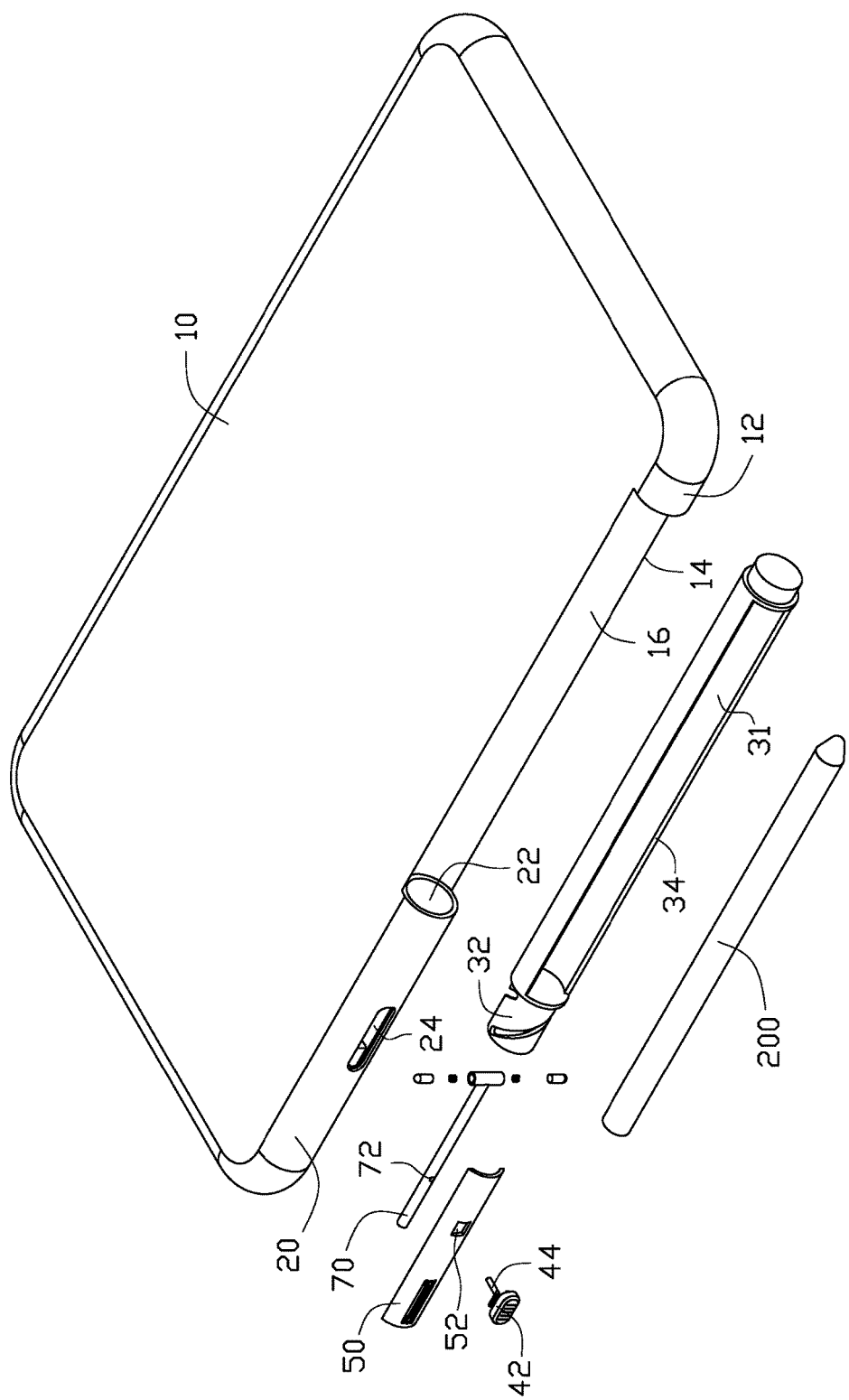
FIG. 3 is an exploded view of the stylus receiving apparatus shown in FIG. 1.
Figure 4:
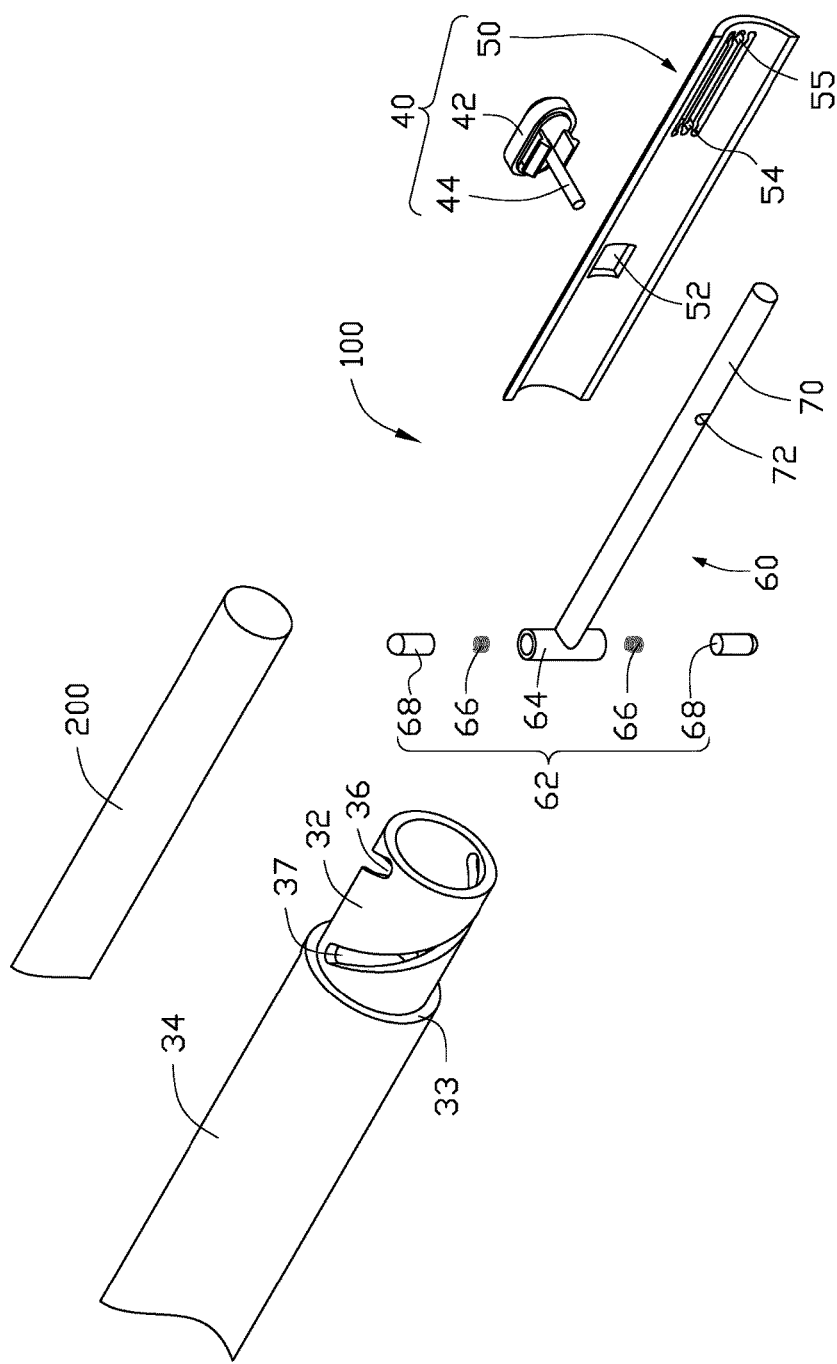
FIG. 4 is similar to FIG. 1 but viewed from a different viewpoint.
Figure 5:
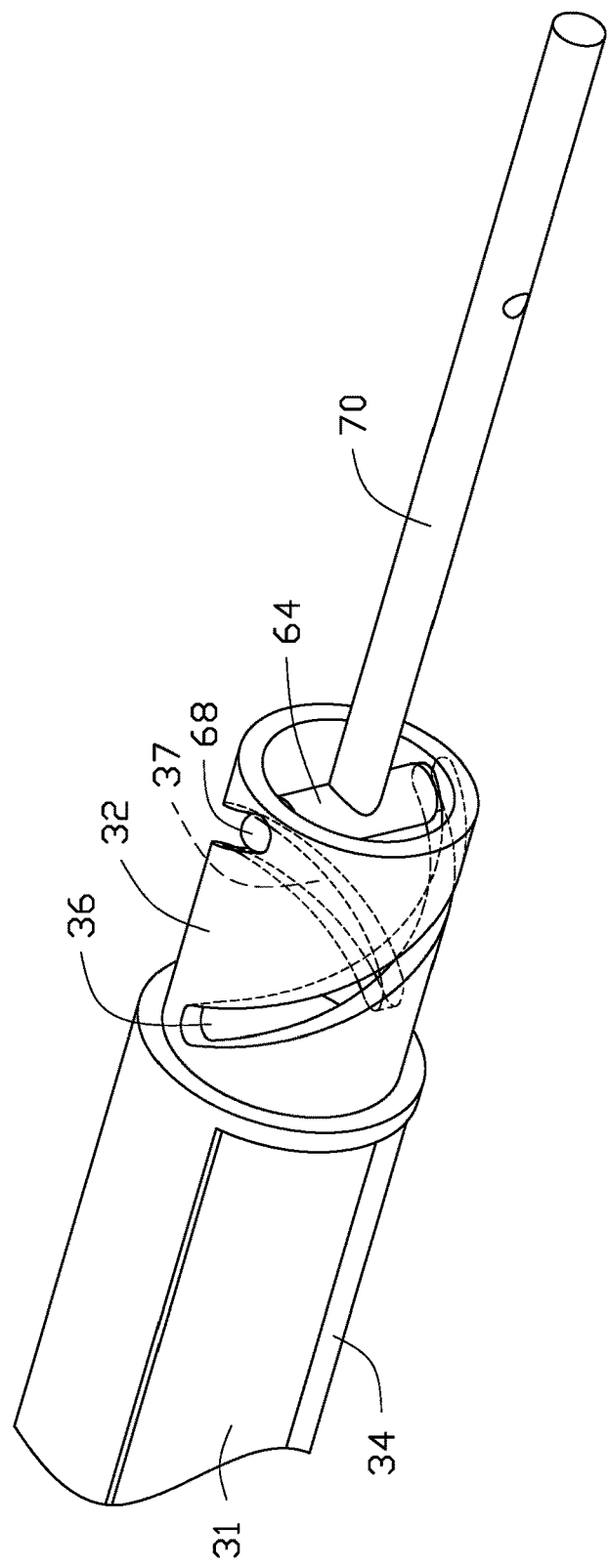
FIG. 5 is an isometric view of a guiding member locked in a sleeve in the apparatus of FIG. 1.

FIGS. 3-5 illustrate the receiving box 10 which includes a first positioning shell 20, a second positioning shell 12, and a connecting shell 14. The connecting shell 14 connects the first positioning shell 20 with the second positioning shell 12. The connecting shell 14 defines a receiving groove 16. The first positioning shell 20 defines a receiving hole 22 and an accepting hole 24. The receiving hole 22 communicates with the receiving groove 16 in a first direction. The accepting hole 24 communicates with the receiving hole 22 in a second direction perpendicular to the first direction.

The rotating member 30 is rotatably received in the receiving groove 16 and is positioned between the first positioning shell 20 and the second positioning shell 12. The rotating member 30 is immovable along the first direction. The rotating member 30 includes a sleeve 32 and a rotating body 34. The rotating body 34 defines the opening 31. The stylus 200 passes through the opening 31 to be positioned in the rotating body 34. A first sliding groove 36 and a second sliding groove 37 are defined on inner surface of the sleeve 32. The first sliding groove 36 and the second sliding groove 37 are curved. Horizontal distances between different pairs of groove points of the first sliding groove 36 and the second sliding groove 37 on different cross-sections of the sleeve 32 are same.

A size of outside diameter of the sleeve 32 is smaller than a size of inside diameter of the rotating body 34, and a step 33 is formed between the sleeve 32 and the rotating body 34. The sleeve 32 is received in the receiving hole 22. The step 33 abuts a first positioning shell end 20 adjacent to the second positioning shell 12. An end of the rotating body 34 away from the sleeve 32 abuts the second positioning shell 12. A positioning pillar 38 protrudes from the end of the rotating body 34 away from the sleeve 32. The positioning pillar 38 is rotatably received in the second positioning shell 12.

The stylus receiving apparatus 100 further includes a toggle 40 and a guiding member 60. The guiding member 60 is received in the receiving hole 22. The guiding member 60 includes a locking member 62. Two locking member ends are locked in the first sliding groove 36 and the second sliding groove 37. The locking member 62 includes a main body 64, an elastic member 66, and two locking bodies 68. The elastic member 66 is received in the main body 64. The two locking bodies 68 abut two ends of the elastic member 66 and are partly exposed out of the main body 64. When the two locking bodies 68 are locked to the first sliding groove 36 and the second sliding groove 37, the two locking bodies 68 press the elastic member 66 to allow the two locking bodies 68 to lock in the first sliding groove 36 and the second sliding groove 37. In another exemplary embodiment, the locking member 62 is molded in one piece, of elastic material. When the locking member 62 is locked to the first sliding groove 36 and the second sliding groove 37, the locking member 62 is deformed to allow two locking member ends to lock in the first sliding groove 36 and the second sliding groove 37.

Figure 6:
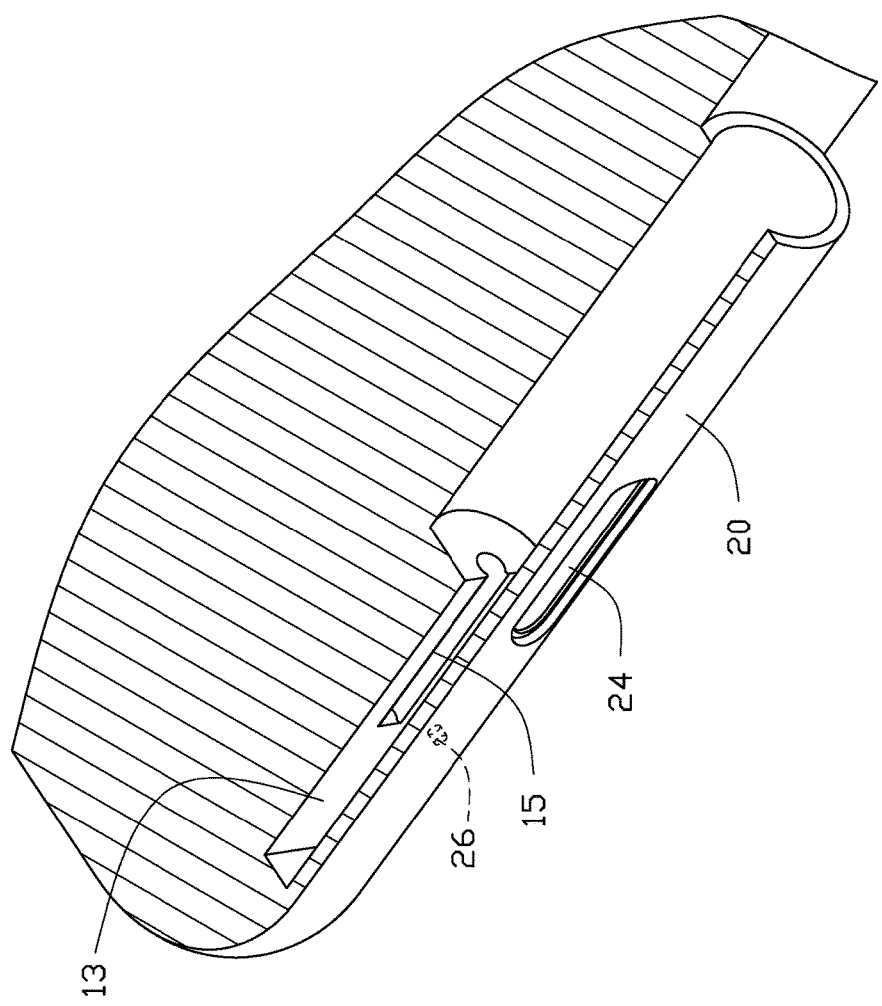
FIG. 6 is a cross-section view of a receiving box in of the apparatus of FIG. 1.

The toggle 40 is movably received in the accepting hole 24 and detachably connected to the guiding member 60. The guiding member 60 further includes a guiding pole 70 attached to the locking member 62. The guiding pole 70 is received in the receiving hole 22 along the first direction. The guiding pole 70 defines a fixing hole 72 on lateral surface of the guiding pole 70. The toggle 40 includes an operation portion 42 and a fixing pole 44 fixed to the operation portion 42. The fixing pole 44 passes through the accepting hole 24 to be received in the fixing hole 72. FIG. 6 illustrates that a guiding portion 13 is fixed in the receiving groove 16. The guiding portion 13 defines a guiding groove 15. The guiding pole 70 is slidably received in the guiding groove 15.

Figure 7:
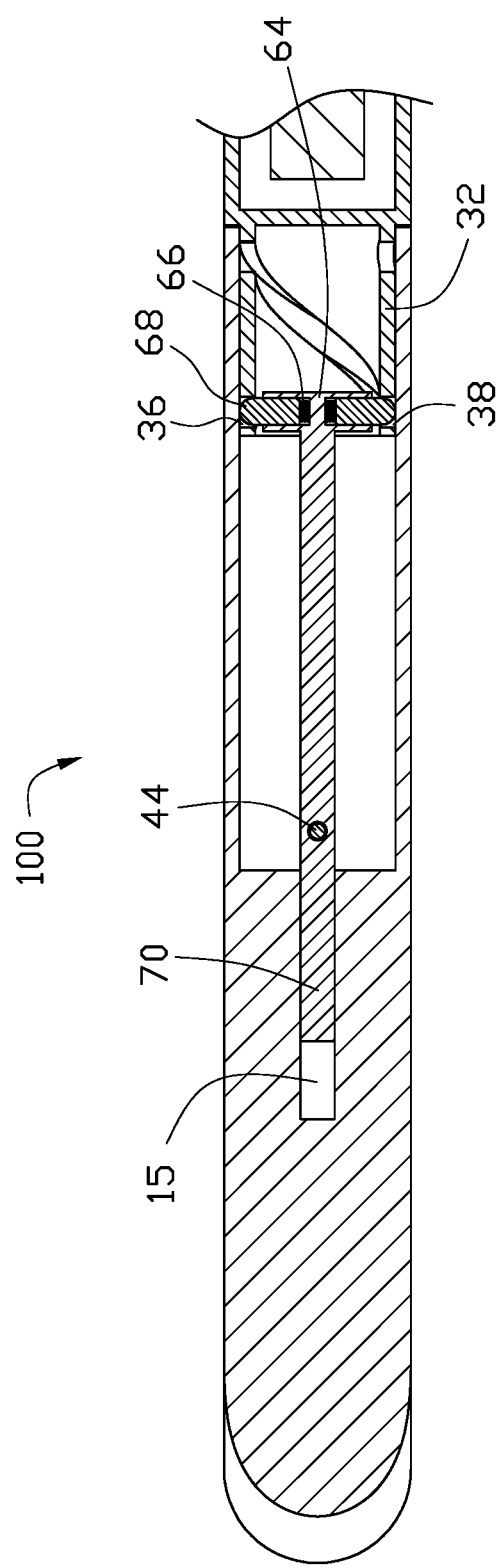
FIG. 7 is a cross-section view of the stylus receiving apparatus along line VII-VII of FIG. 2.
Figure 8:
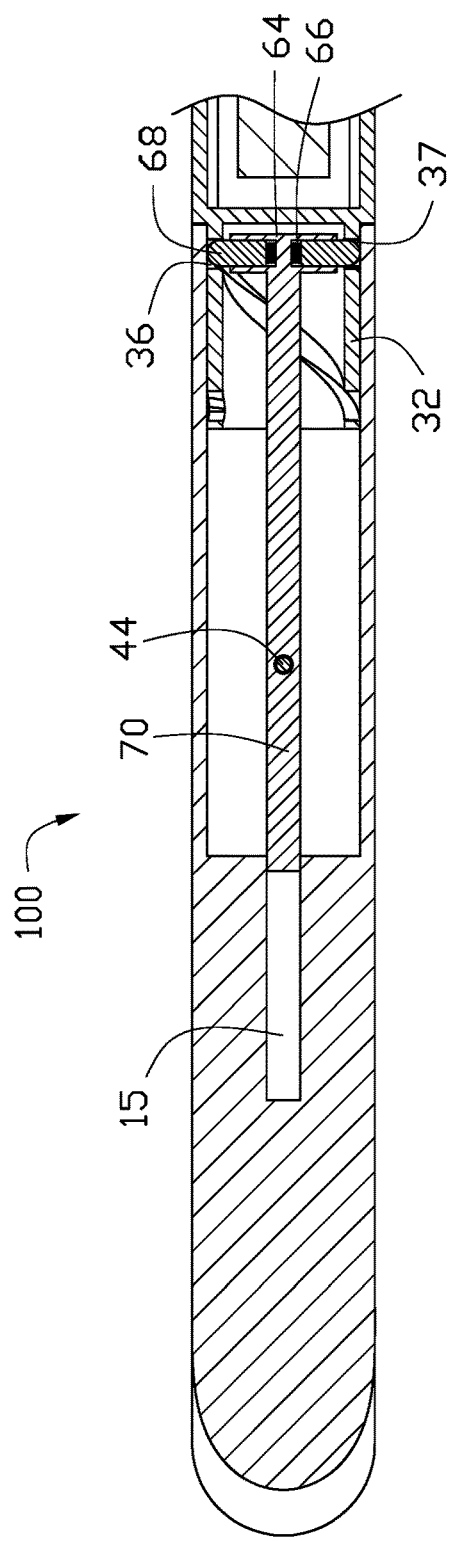
FIG. 8 is a cross-section view of the stylus receiving apparatus in FIG. 1.

FIGS. 2 and 7-8 show that when the toggle 40 is toggled to an end of the accepting hole 24 away from the second positioning shell 12, the two locking member ends are locked in a first pair of groove points of the first sliding groove 36 and the second sliding groove 37 away from the second positioning shell 12. The opening 31 is thus exposed. The stylus 200 can then be placed in or taken out of the rotating body 34. When toggle 40 is toggled to move toward an end of the accepting hole 24 adjacent to the second positioning shell 12, the toggle 40 pushes the guiding member 60 to slide in the first sliding groove 36 and the second sliding groove 37, driving the rotating member 30 to rotate. When the toggle 40 is toggled to the end of the accepting hole 24 away from the second positioning shell 12, the two locking member ends are locked in a second pair of groove points of the first sliding groove 36 and the second sliding groove 37. The second pair of groove points are adjacent to the second positioning shell 12. When the two locking member ends are locked in a second pair of groove points, the rotating member 30 rotates to allow the opening 31 to become opposite to the connecting shell 14. Thus, the stylus 200 can be positioned between the connecting shell 14 and the first rotating body 34 to prevent the stylus 200 from moving out of the opening 31.

FIGS. 4 and 6 illustrate that the toggle 40 further includes a fixing member 50. The fixing member 50 is slidably attached to the first positioning shell 20. The fixing member 50 defines a through hole 51, an elastic sliding groove 53, and two positioning holes 54 communicating with two ends of the elastic sliding groove 53. The through hole 52 is opposite to the accepting hole 24. The fixing member 50 passes through the accepting hole 24 and the through hole 52 to attach to the guiding pole 70. The first positioning shell 20 includes a positioning pin 26 in the receiving hole 22.

Figure 9:
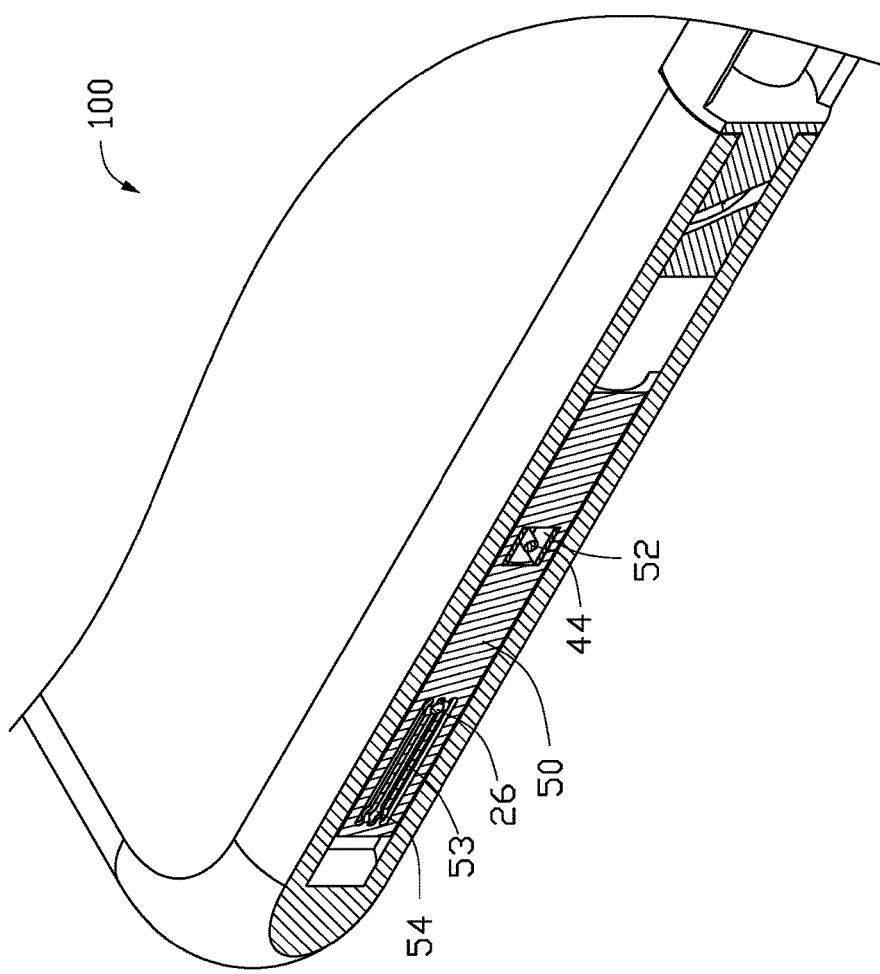
FIG. 9 is a cross-section view of the stylus receiving apparatus in FIG. 2 from another viewpoint.

Further referring to FIG. 9, when the toggle 40 is toggled to move toward the end of the accepting hole 24 away from the second positioning shell 12, the positioning pins 26 slide along the elastic groove 53. When the toggle 40 is toggled to the end of the accepting hole 24 away from the second positioning shell 12, the positioning pin 26 is locked in the positioning hole 54 adjacent to the second positioning shell 12. When the toggle 40 is toggled to the end of the accepting hole 24 adjacent to the second positioning shell 12, the positioning pins 26 are locked in the positioning hole 54 away from the second positioning shell 12.

The stylus receiving apparatus 100 is a part of an electronic device and positioned at a side edge of a shell of the electronic device. Thus, after a user uses the electronic device, the stylus 200 can be placed in the electronic device and safely kept there.

The exemplary embodiments shown and described above are only examples. Even though numerous descriptions and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims.

What is claimed is:

1. A stylus receiving apparatus comprising:
    a receiving box comprising a first positioning shell, a second positioning shell, and a connecting shell; wherein the connecting shell connects the first positioning shell with the second positioning shell and defines a receiving groove; the first positioning shell defines a receiving hole and an accepting hole; the receiving hole in air communication with the receiving groove in a first direction; and the accepting hole communicates with the receiving hole in a second direction;
    a guiding member received in the receiving hole and comprising a locking member;
    a toggle movably received in the accepting hole and detachably connected to the guiding member; and
    a rotating member comprising a sleeve and a rotating body, the rotating body defining an opening and rotatably received in the receiving groove, the rotating body abutting between the first positioning shell and the second positioning shell; a first sliding groove and a second sliding groove defined on the sleeve; distances between different pairs of groove points of the first sliding groove and the second sliding groove on different cross-sections of the sleeve being same;
    wherein two locking member ends are locked in the first sliding groove and the second sliding groove, when the toggle is toggled to a first end of the accepting hole, the two locking member ends are locked a first pair of groove points of the first sliding groove and the second sliding groove and the opening is exposed; when the toggle is toggled to a second end of the accepting hole opposite to the first end, the two locking member ends are locked to a second pair of groove points of the first sliding groove and the second sliding groove, and the rotating member rotates to allow the opening to opposite to the connecting shell.

2. The stylus receiving apparatus as claimed in claim 1, wherein a size of outside diameter of the sleeve is smaller than a size of inside diameter of the rotating body and a step is formed between the sleeve and the rotating body, the sleeve is received in the receiving hole; the step abuts a first positioning shell end adjacent to the second positioning shell.

3. The stylus receiving apparatus as claimed in claim 2, wherein a rotating body end, away from the sleeve, abuts the second positioning shell; a positioning pillar protrudes from the rotating body end away from the sleeve; and the positioning pillar is rotatably received in the second positioning shell.

4. The stylus receiving apparatus as claimed in claim 1, wherein the guiding member further comprises a guiding pole attached to the locking member, the guiding pole is received in the receiving hole along the first direction, the guiding pole defines a fixing hole on lateral surface of the guiding pole, the toggle comprises an operation portion and a fixing pole fixed to the operation portion; and the fixing pole passes through the accepting hole to be received in the fixing hole.

5. The stylus receiving apparatus as claimed in claim 4, wherein a guiding portion is fixed in the receiving groove, the guiding portion defines a guiding groove; and the guiding pole is slidably received in the guiding groove.

6. The stylus receiving apparatus as claimed in claim 1, wherein the toggle further comprises a fixing member, the fixing member defines a through hole, the through hole is opposite to the accepting hole, and the fixing member passes through the accepting hole and the through hole to attach the guiding member.

7. The stylus receiving apparatus as claimed in claim 6, wherein, the first positioning shell comprises a positioning pin in the receiving hole, the fixing member further defines two positioning holes; and when the toggle is toggled to the end of the accepting hole, the positioning pin is locked in one of the positioning holes away from the second positioning shell.

8. The stylus receiving apparatus as claimed in claim 7, wherein when the toggle is toggled to the second end of the accepting hole, the positioning pin is locked in the positioning hole adjacent to the second positioning shell.

9. The stylus receiving apparatus as claimed in claim 1, wherein the first sliding groove and the second sliding groove are curved.

10. The stylus receiving apparatus as claimed in claim 1, wherein the first sliding groove and the second sliding groove are defined on inner surface of the sleeve.

11. A stylus receiving apparatus comprising:
a receiving box defines a receiving groove, a receiving hole and an accepting hole; the receiving hole communicates with the receiving groove in a first direction; and the accepting hole communicates with the receiving hole in a second direction;
a guiding member received in the receiving hole and comprising a locking member;
a toggle movably received in the accepting hole and detachably connected to the guiding member;
a rotating member comprising a sleeve and a rotating body, the rotating body defining an opening and rotatably received in the receiving groove, the rotating body being immovable along the first direction; a first sliding groove and a second sliding groove defined on inner surface of the sleeve; distances between different pairs of groove points of the first sliding groove and the second sliding groove on different cross-sections of the sleeve being same;
wherein two locking member ends are locked in the first sliding groove and the second sliding groove, when the toggle is toggled to a first end of the accepting hole, the two locking member ends are locked a first pair of groove points of the first sliding groove and the second sliding groove and the opening is exposed; when the toggle is toggled to a second end of the accepting hole opposite to the first end, the two locking member ends are locked a second pair of groove points of the first sliding groove and the second sliding groove, and the rotating member rotates to shield the opening.

12. The stylus receiving apparatus as claimed in claim 11, wherein the receiving box comprises a first positioning shell, a second positioning shell and a connecting shell connected the first positioning shell with the second positioning; a size of outside diameter of the sleeve is smaller than a size of inside diameter of the rotating body and a step is formed between the sleeve and the rotating body; the sleeve is received in the receiving hole; the step abuts a first positioning shell end adjacent to the second positioning shell.

13. The stylus receiving apparatus as claimed in claim 12, wherein a rotating body end away from the sleeve abuts the second positioning shell; a positioning pillar protrudes from the rotating body end away from the sleeve; and the positioning pillar is rotatably received in the second positioning shell.

14. The stylus receiving apparatus as claimed in claim 12, wherein the toggle further comprises a fixing member, the fixing member defines a through hole, the through hole is opposite to the accepting hole; and the fixing member passes through the accepting hole and the through hole to attach the guiding member.

15. The stylus receiving apparatus as claimed in claim 14, wherein the first positioning shell comprises a positioning pin in the receiving hole, the fixing member further defines two positioning holes; and when the toggle is toggled to the end of the accepting hole, the positioning pin is locked in the positioning hole away from the second positioning shell.

16. The stylus receiving apparatus as claimed in claim 15, wherein when the toggle is toggled to the second end of the accepting hole, the positioning pin is locked in the positioning hole adjacent to the second positioning shell.

17. The stylus receiving apparatus as claimed in claim 11, wherein the guiding member further comprises a guiding pole attached to the locking member, the guiding pole is received in the receiving hole along the first direction, the guiding pole defines a fixing hole on lateral surface of the guiding pole, the toggle comprises an operation portion and a fixing pole fixed to the operation portion; and the fixing pole passes through the accepting hole to be received in the fixing hole.

18. The stylus receiving apparatus as claimed in claim 17, wherein a guiding portion is fixed in the receiving groove, the guiding portion defines a guiding groove; and the guiding pole is slidably received in the guiding groove.

19. The stylus receiving apparatus as claimed in claim 11, wherein the first sliding groove and the second sliding groove are curved.

20. The stylus receiving apparatus as claimed in claim 11, wherein the first sliding groove and the second sliding groove are defined on inner surface of the sleeve.

* * * * *